US011055919B2

(12) United States Patent
Nattinger et al.

(10) Patent No.: US 11,055,919 B2
(45) Date of Patent: Jul. 6, 2021

(54) MANAGING CONTENT IN AUGMENTED REALITY

(71) Applicant: GOOGLE LLC, Mountain View, CA (US)

(72) Inventors: Elena Nattinger, San Carlos, CA (US); Austin McCasland, San Francisco, CA (US); Seth Raphael, Portland, OR (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/395,832

(22) Filed: Apr. 26, 2019

(65) Prior Publication Data

US 2020/0342669 A1    Oct. 29, 2020

(51) Int. Cl.
*G06T 19/00* (2011.01)
*G06T 7/70* (2017.01)
*G06N 20/00* (2019.01)
*G06K 9/00* (2006.01)

(52) U.S. Cl.
CPC ........ *G06T 19/006* (2013.01); *G06K 9/00624* (2013.01); *G06N 20/00* (2019.01); *G06T 7/70* (2017.01); *G06T 19/003* (2013.01); *G06T 2207/20081* (2013.01)

(58) Field of Classification Search
None
See application file for complete search history.

(56) References Cited

U.S. PATENT DOCUMENTS

| 10,037,699 | B1* | 7/2018 | Toyoda ................. G06N 20/00 |
| 10,482,674 | B1* | 11/2019 | Wu ........................ G06N 20/00 |
| 2010/0045701 | A1 | 2/2010 | Scott et al. |
| 2015/0062120 | A1 | 3/2015 | Reisner-Kollmann et al. |
| 2015/0331576 | A1* | 11/2015 | Piya .................... G06F 3/04815 715/850 |
| 2017/0061692 | A1 | 3/2017 | Giraldi et al. |
| 2017/0206691 | A1* | 7/2017 | Harrises ............ G02B 27/0172 |
| 2017/0337735 | A1* | 11/2017 | Goslin .................... G06F 3/011 |
| 2018/0260020 | A1 | 9/2018 | Kamhi et al. |
| 2018/0270631 | A1* | 9/2018 | High .................... G01G 19/387 |

(Continued)

FOREIGN PATENT DOCUMENTS

WO    2015016798 A2    2/2015

OTHER PUBLICATIONS

"ARCore overview", Google Developers (https://developers.google.com/ar/discover/), Feb. 28, 2019, 3 pages.
(Continued)

*Primary Examiner* — Hilina K Demeter
(74) *Attorney, Agent, or Firm* — Brake Hughes Bellermann LLP

(57) ABSTRACT

According to an aspect, a method for managing augmented reality (AR) content in an AR environment includes obtaining image data associated with a scene of an AR environment, where the AR environment includes AR content positioned in a coordinate space of the AR environment. The method includes detecting a physical object from the image data, associating the physical object with the AR content, and storing coordinates of the AR content and information indicating that the physical object is associated with the AR content in an AR scene storage for future AR localization.

18 Claims, 11 Drawing Sheets

(56) References Cited

U.S. PATENT DOCUMENTS

2019/0065027 A1* 2/2019 Hauenstein ........... G06T 19/006
2019/0295315 A1   9/2019 Levinson et al.
2019/0333275 A1* 10/2019 Wang .................... G06T 7/20
2019/0354699 A1* 11/2019 Pekelny ................ G06F 21/604

OTHER PUBLICATIONS

"Share AR Experiences with Cloud Anchors", Google Developers (https://developers.google.com/ar/develop/java/cloud-anchors/overview-android#hosting_anchors), Feb. 28, 2019, 3 pages.
Invitation to Pay Additional Fees and Partial International Search for Application No. PCT/US2019/065235, dated Jun. 3, 2020, 10 pages.
Invitation to Pay Additional Fees and Partial International Search for Application No. PCT/US2019/065239, dated Jun. 2, 2020, 8 pages.
"Detecting Images in an AR Experience", Apple Developer Documentation, retrieved on Jul. 1, 2020 from https://developer.apple.com/documentation/arkit/detecting_images_in_an_ar_experience, 5 pages.
Persson, et al., "Learning Actions to Improve the Perceptual Anchoring of Objects", Frontiers in Robotics and AI, vol. 3, Article 76, Jan. 30, 2017, 17 pages.
Sun, et al., "Motion Removal for Reliable RGB-D Slam in Dynamic Environments", Robotics and Autonomous Systems, vol. 108, Oct. 1, 2018, pp. 115-128.
Wang, et al., "Coarse Semantic-Based Motion Removal for Robust Mapping in Dynamic Environments", IEEE Access, vol. XX, retrieved on Jul. 1, 2020 from https://www.researchgate.net/publication/340821111_Coarse_Semantic-based_motion_Removal_for_Robust_Mapping_in_Dynamic_Environments, 2017, 17 pages.
Wang, et al., "Simultaneous Localization, Mapping and Moving Object Tracking", Journal of Robotics, 2007, 47 pages.
Wang, "Simultaneous Localization, Mapping and Moving Object Tracking", The International Journal of Robotics Research, vol. 26, No. 9, Sep. 1, 2007, 164 pages.
Wangsiripitak, et al., "Avoiding Moving Outliers in Visual Slam by Tracking Moving Objects", IEEE Int Conf on Robotics and Automation, Kobe, Japan, 2009, 6 pages.
Yang, et al., "Robust RGB-D Slam in Dynamic Environment Using Faster R-CNN", 3rd IEEE International Conference on Computer and Communications (ICCC), Dec. 1, 2017, pp. 2398-2402.

* cited by examiner

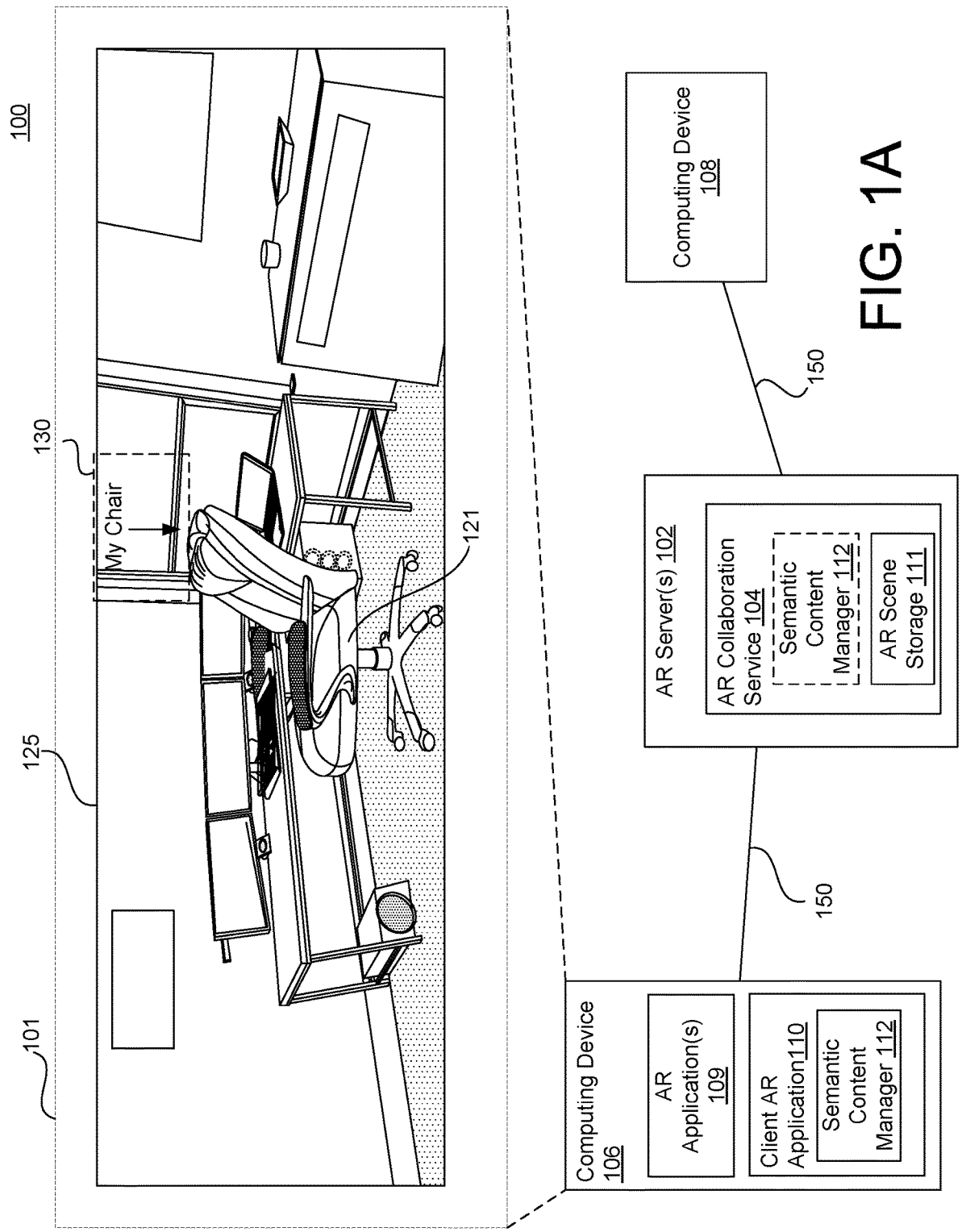

MANAGING CONTENT IN AUGMENTED REALITY

RELATED APPLICATION

This application is related to application Ser. No. 16/396,145, filed on Apr. 26, 2019, entitled "System and Method for Creating Persistent Mappings in Augmented Reality", which is incorporated by reference in its entirety.

TECHNICAL FIELD

This description generally relates to managing content in augmented reality.

BACKGROUND

When users attach persistent, shared augmented reality (AR) content, the coordinates of the AR content are stored. However, the AR content is often referential to the object that is physically located nearby. If the physical object moves or is removed from the AR scene, the AR content that has been positioned may become inaccurate since the AR content references an object that is no longer in the original location. For example, an AR application may allow users to attach an AR label to objects that require repair in their workplace such as adding an AR label to a machine that needs repair. If the machine is removed or moved to another location, the AR label that is still rendered in the AR environment may not be relevant.

SUMMARY

According to an aspect, a method for managing augmented reality (AR) content in an AR environment includes obtaining image data associated with a scene of an AR environment, where the AR environment includes AR content positioned in a coordinate space of the AR environment. The method includes detecting a physical object from the image data, associating the physical object with the AR content, and storing coordinates of the AR content and information indicating that the physical object is associated with the AR content in an AR scene storage for future AR localization.

According to some aspects, the method includes one or more of the following features (or any combination thereof). The detecting the classification of the physical object may be based on one or more machine learning (ML) models. The one or more ML models is configured to determine a classification of the physical object, wherein the classification is associated with the AR content. The image data is first image data, the method further includes obtaining second image data of at least a portion the scene to localize the AR content, detecting that the physical object is not present in the second image data, and causing the AR content to not be rendered in the AR environment. In some examples, the method includes obtaining second image data of at least a portion the scene to localize the AR content, detecting that the physical object has moved to a new location in the scene of the AR environment based on the second image data and the AR scene storage, and moving the AR content in the AR environment to a location that corresponds to the new location of the physical object in the second image data. In some examples, the method includes obtaining second image data of at least a portion the scene to localize the AR content, detecting that the physical object is not present or has moved to a new location in the scene of the AR environment based on the second image data and the AR scene storage, and transmitting, via an application programming interface (API), a notification to a developer associated with the AR content of the AR environment. In some examples, the AR content is located proximate to the physical object. In some examples, the associating includes analyzing one or more terms associated with the AR content, and determining that at least one of the terms is associated with a classification of the physical object.

According to an aspect, an augmented reality (AR) system for managing AR content in an AR environment includes an AR collaborative service executable by at least one server, and a client AR application executable by a computing device, where the client AR application is configured to communicate with the AR collaborative service via one or more application programming interfaces (APIs). The AR collaborative service or the client AR application configured to obtain image data associated with a scene of the AR environment, where the AR environment includes AR content positioned in a coordinate space of the AR environment and the AR content is associated with a physical object in the AR environment, detect that the physical object is not present in the image data or is moved to a new position in the scene, and initiate an action to manage the AR content associated with the physical object.

According to some aspects, the AR system may include any of the above/below features (or any combination thereof). The AR collaborative service or the client AR application is configured to detect the physical object using one or more machine learning (ML) models. The AR collaborative service or the client AR application is configured to detect a type of the physical object using the one or more ML models, wherein the type is associated with the AR content. The client AR application is configured to cause the AR content not to be rendered from the AR environment. The AR collaborative service or the client AR application is configured to move the AR content in the AR environment to a location that corresponds to the new position of the physical object in the image data. The AR collaborative service or the client AR application is configured to transmit, via an application programming interface (API), a notification to a developer of the AR content of the AR environment. The AR collaborative service or the client AR application is configured to analyze one or more terms associated with the AR content, and determine that at least one of the terms is associated with a classification of the physical object.

According to an aspect, a non-transitory computer-readable medium storing executable instructions that when executed by at least one processor are configured to manage augmented reality (AR) content in an AR environment, where the executable instructions includes instructions that cause the at least one processor to obtain first image data associated with a scene of an AR environment, where the AR environment includes AR content positioned in a coordinate space of the AR environment, detect a type of a physical object located proximate to the AR content from the first image data, store coordinates of the AR content with a link to the type of the physical object in an AR scene storage, obtain second image data associated with the scene of the AR environment to localize the AR environment, detect that the type of the physical object is not present in the second image data or is moved to a new position in the scene based on the second image data and the AR scene storage, and initiate an action to manage the AR content associated with the physical object.

According to some aspects, the non-transitory computer-readable medium may include any of the above/below features (or any combination thereof). The initiate the action may include instructions to not render the AR content from the AR environment. The initiate the action may include instructions to move the AR content in the AR environment to a location that corresponds to the new position of the physical object in the second image data. The initiate the action may include instructions to transmit, via an application programming interface (API), a notification to a developer of the AR content. The type of the physical object is detected using one or more machine learning (ML) models.

The details of one or more implementations are set forth in the accompanying drawings and the description below. Other features will be apparent from the description and drawings, and from the claims.

BRIEF DESCRIPTION OF THE DRAWINGS

FIG. 1A depicts an AR system having a semantic content manager according to an aspect.

Like reference symbols in the various drawings indicate like elements.

DETAILED DESCRIPTION

Figure 1B:
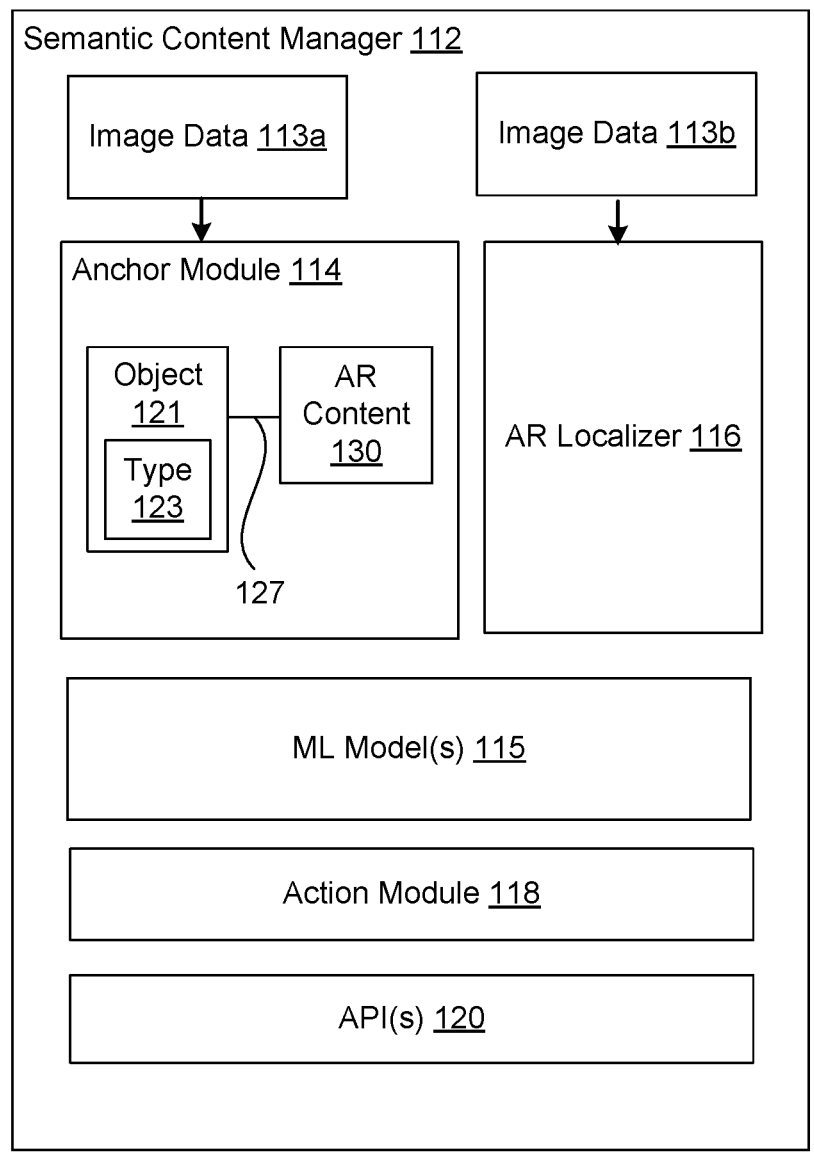
FIG. 1B depicts an example of the semantic content manager according to an aspect.

The embodiments provide a semantic content manager configured to detect and classify, using one or more machine learning (ML) models, a physical object referenced by or located proximate to AR content from image data captured by a device's camera, and store the classification along with coordinates of the AR content in the AR persistent space. The semantic content manager may generate a link between the AR content and the nearby physical object such that the AR content is attached to the object that relates to the AR content. For example, if the AR content is positioned proximate to a chair in the real-word, the semantic content manager may analyze the camera's input, detect the classification of the object as "chair", and initiate storage of the classification along with the AR content's coordinates in the AR persistent space.

When the AR persistent scene is re-localized in a future session, the semantic content manager may detect if the object that is associated with the AR content is present in the current AR scene or moved to a different location in the AR current scene. In some examples, if the object has moved to different location in the current AR scene, the semantic content manager may automatically move the AR content to be in a location that corresponds to the new location of the object. In some examples, if the object has been removed, the semantic content manager may cause the AR content not to be rendered in the AR scene. In some examples, if the object is not present or has moved, the semantic content manager may transmit a notification to a developer of the AR content informing them of the absence or movement such that the developer can decide to not show the AR content, move the location of the AR content, or leave the AR content in the original location.

As a result, an AR scene may appear to be localized more accurately when the AR content that is associated with a certain physical object continues to be spatially associated with that physical object even if the physical object moves in the physical space. Also, the technical benefits may include the removal of inaccurate placement of AR content linked to physical objects that have been removed from the scene and should not be rendered by an application. In addition, the semantic content manager may provide the ability to refine localization of specific AR content to compensate for potential drift or errors in large scale localization. For example, when the localization result is offset, the AR content would be positioned in a location different from desired location. If that AR content is known to be associated with a specific object, the techniques discussed herein may shift the AR content's location to more accurately align with the physical object in the space even if that requires rendering at a different coordinate position in the localization coordinate space than originally stored.

FIG. 1A illustrates an AR system 100 for managing AR content 130 positioned within a scene 125 of an AR environment 101 according to an aspect. The AR system 100 includes an AR collaborative service 104, executable by one or more AR servers 102, configured to create a multi-user or collaborative AR experience that users can share. The AR collaborative service 104 communicates, over a network 150, with a plurality of computing devices including a computing device 106 and a computing device 108, where a user of the computing device 106 and a user of the computing device 108 may share the same AR environment 101.

The AR environment 101 may involve a physical space which is within the view of a user and a virtual space within which the AR content 130 is positioned. As shown in FIG. 1A, the AR content 130 is a text description ("My Chair") along with an arrow that points to an object 121 (e.g., a chair), where the object 121 is a physical object in the physical space. The AR content 130 may include virtual content that is added by one or more users. The AR content 130 may include objects, annotations, or other information. Localizing (or providing or rendering) the AR environment 101 may involve altering the user's view of the physical space by displaying the AR content 130 such that it appears to the user to be present in, or overlayed onto or into, the physical space in the view of the user. This displaying of the AR content 130 is therefore according to a mapping between the virtual space and the physical space. Overlaying of the AR content 130 may be implemented, for example, by superimposing the AR content 130 into an optical field of view of a user of the physical space, by reproducing a view of the user of the physical space on one or more display screens, and/or in other ways, for example by using head up displays, mobile device display screens and so forth.

The computing device 106 is configured to execute a client AR application 110. In some examples, the client AR application 110 is a software development kit (SDK) that operates in conjunction with one or more AR applications 109. The AR applications 109 may be any type of AR applications (e.g., gaming, entertainment, medicine, education, etc.) executable on the computing device 106. In some examples, in combination with one or more sensors on the computing device 106, the client AR application 110 is configured to detect and track its position relative to the physical space, detect the size and location of different types of surfaces (e.g., horizontal, vertical, angled), and estimate the environment's current lighting conditions. The client AR application 110 is configured to communicate with the AR collaborative service 104 via one or more application programming interfaces (APIs). Although two computing devices are illustrated in FIG. 1A, the AR collaborative service 104 may communicate and share the AR environment 101 with any number of computing devices.

The computing device 106 may be, for example, a computing device such as a controller, or a mobile device (e.g., a smartphone, a tablet, a joystick, or other portable controller(s)). In some examples, the computing device 106 includes a wearable device (e.g., a head mounted device) that is paired with, or communicates with a mobile device for interaction in the AR environment 101. The AR environment 101 is a representation of an environment that may be generated by the computing device 106 (and/or other virtual and/or augmented reality hardware and software). In this example, the user is viewing the AR environment 101 with the computing device 106. Since the details and use of the computing device 108 may be the same with respect to the computing device 106, the details of the computing device 108 are omitted for the sake of brevity.

As shown in FIG. 1A, the AR system 100 includes a semantic content manager 112 configured to manage AR content 130 such that the AR content 130 is attached to (or linked to) an object 121 (or a classification of an object 121) referenced by or related to the AR content 130. Then, when localizing the AR content 130 on the computing device 106, the semantic content manager 112 is configured to re-positioned or remove from the AR content 130 when the object 121 has moved to a different location in the current scene 125 or not present in the current scene 125. In some examples, the client AR application 110 is configured to execute the semantic content manager 112 (e.g., included within the client AR application 110 executable by the computing device 106). In some examples, the AR collaboration service 104 is configured to execute the semantic content manager 112 (e.g., included within the AR collaboration service 104 executable by the AR server 102). In some examples, one or more operations of the semantic content manager 112 are executed by the client AR application 110 and one or more operations of the semantic content manager 112 are executed by the AR collaboration service 104.

Generally, the semantic content manager 112 is configured to detect and classify an object 121 referenced by or located proximate to AR content 130, and store the classification along with coordinates of the AR content 130 in AR scene storage 111. In some examples, the AR scene storage 111 includes a coordinate space in which visual information (e.g., detected by the computing device 106) from the physical space and the AR content 130 are positioned. In some examples, the positions of the visual information and the AR content 130 are updated in the AR scene storage 111 from image frame to image frame. In some examples, the AR scene storage 111 includes a three-dimensional (3D) map of the AR environment 101. In some examples, the AR scene storage 111 includes a sparse point map of the AR environment. The information in the AR scene storage 111 is used to share the AR environment 101 with one or more users that join the AR environment 101 and to calculate where each user's computing device is located in relation to the physical space of the AR environment 101 such that multiple users can view and interact with the AR environment 101.

When the AR persistent scene from the AR scene storage 111 is re-localized in a future session, the semantic content manager 112 may detect if the object 121 that is associated with the AR content 130 is present in the scene 125 or moved to a different location in the scene 125. In some examples, if the object 121 has moved to different location in the scene 125, the semantic content manager 112 may automatically move the AR content 130 to a location that corresponds to the new location of the object 121. In some examples, if the object 121 has been removed from the physical space, the semantic content manager 112 may cause the AR content 130 not to be rendered on a display screen associated with the computing device 106. In some examples, if the object 121 is not present or has moved, the semantic content manager 112 may transmit a notification to a developer of the AR content 130 informing them of the absence or movement such that the developer can decide to not show the AR content 130, move the location of the AR content 130, or leave the AR content 130 in the original location.

FIG. 1B illustrates a schematic diagram of the semantic content manager 112 according to an aspect. The semantic content manager 112 includes an anchor module 114 configured to obtain image data 113a associated with the scene 125 of the AR environment 101. In some examples, the anchor module 114 is configured to execute when saving the scene 125 to the AR scene storage 111. A user may use a camera on the computing device 106 to capture the scene 125 from the physical space of the AR environment 101. In some examples, the image data 113a includes image data of one or more frames captured by the computing device 106. The AR environment 101 includes AR content 130 positioned in a coordinate space of the AR environment 101. For example, a user may add the AR content 130 to the AR environment 101, and the location of the AR content 130 may be indicated by its position (e.g., x, y, z locations) in the coordinate space of the AR environment 101.

Figure 2:
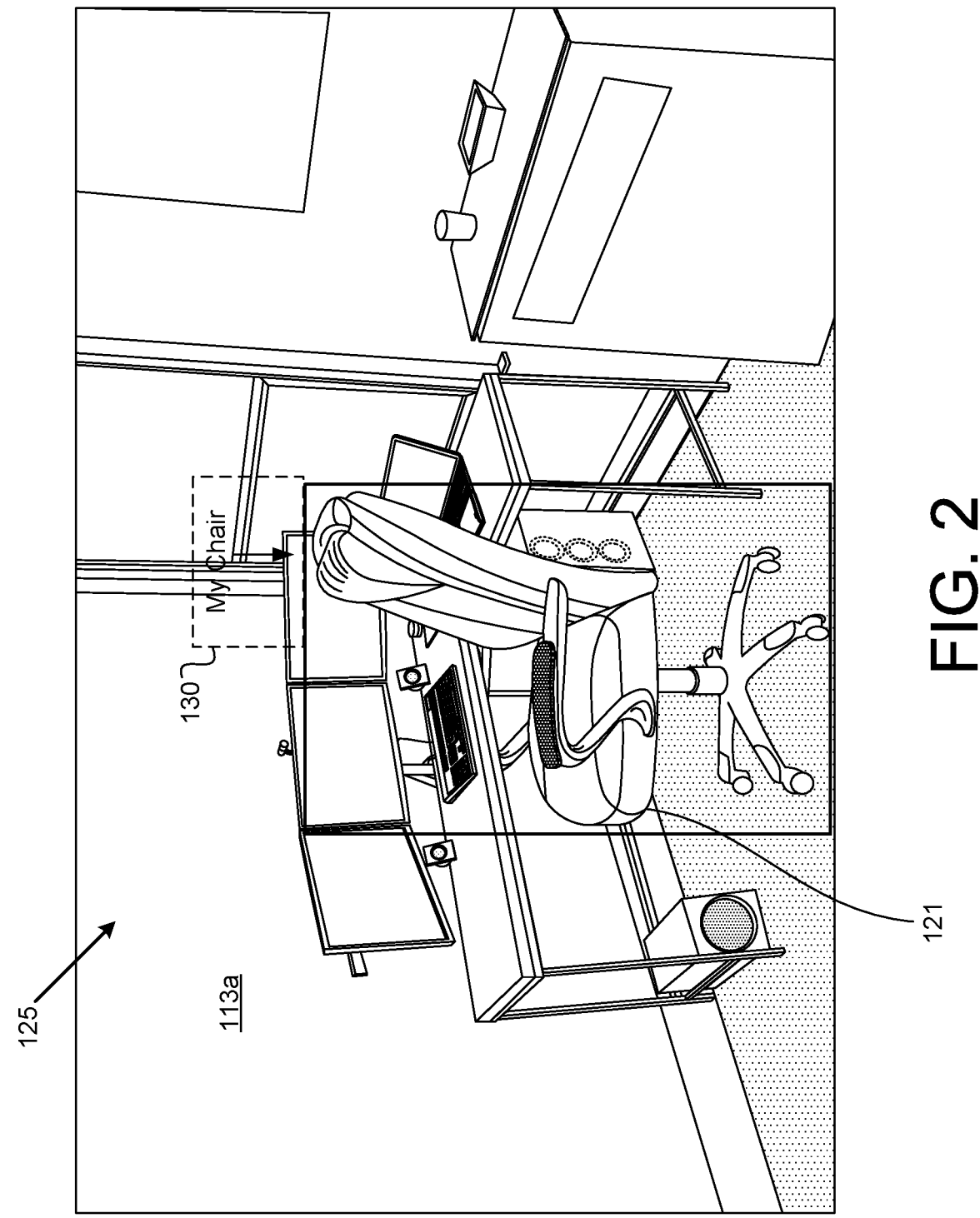
FIG. 2 depicts an AR scene with a detected object referenced by AR content according to an aspect.

Referring to FIGS. 1B and 2, the anchor module 114 may detect, using one or more machine learning (ML) models 115, an object 121 referenced by or located proximate to the AR content 130 from the image data 113a in the scene 125 of the AR environment. For example, an object 121 positioned relatively close to the AR content 130 may indicate that the AR content 130 references that object 121. As shown in FIG. 2, the AR content 130 is a text description ("My Chair") along with an arrow that points to an object 121 (e.g., a chair), where the object 121 is a physical object in the physical space.

The anchor module 114 may detect the object 121 in the scene 125 by analyzing the image data 113a captured by the computing device 106 according to one or more object recognition techniques. In some examples, the anchor module 114 uses one or more ML models 115 to determine a type 123 of the object 121. The type 123 may include a classification (e.g., a semantic label) of the object 121. In the example of FIGS. 1A and 2, the anchor module 114 may determine the type 123 of the object 121 as a chair (or a chair classification or label). In some examples, the ML models 115 include one or more trained classifiers configured to detect the type 123 of an object 121 in the scene 125 based on the image data 113a. For example, the one or more trained classifiers may detect an object 121 in the scene 125, and assign a semantic label to the object 121. For example, the semantic labels may include different characterizations of objects such as chairs, laptops, desks, etc.

In further detail, the ML classifiers may detect multiple objects within the camera image, with associated positional information (e.g., the recognition of "chair" is associated with a particular portion of the camera frame, not with the frame as a whole. Depth estimate information from other ML and AR models (such as AR visual feature points) can be combined with the labeled portion of a camera frame to estimate the 3D position of a recognized object.

In some examples, the ML models 115 include a neural network. The neural network may be an interconnected group of nodes, each node representing an artificial neuron. The nodes are connected to each other in layers, with the output of one layer becoming the input of a next layer. Neural networks transform an input, received by the input layer, transform it through a series of hidden layers, and produce an output via the output layer. Each layer is made up of a subset of the set of nodes. The nodes in hidden layers are fully connected to all nodes in the previous layer and provide their output to all nodes in the next layer. The nodes in a single layer function independently of each other (i.e., do not share connections). Nodes in the output provide the transformed input to the requesting process.

In some examples, the semantic content manager 112 uses a convolutional neural network in the object classification algorithm, which is a neural network that is not fully connected. Convolutional neural networks therefore have less complexity than fully connected neural networks. Convolutional neural networks can also make use of pooling or max-pooling to reduce the dimensionality (and hence complexity) of the data that flows through the neural network and thus this can reduce the level of computation required. This makes computation of the output in a convolutional neural network faster than in neural networks.

The anchor module 114 may determine that the detected object 121 and its type 123 are associated with the AR content 130. In some examples, if the detected object 121 is within a certain distance of the AR content 130, the anchor module 114 may determine that the detected object 121 is associated with the AR content 130. In some examples, the anchor module 114 is configured to determine a level of relevancy of the object 121 (and/or the type 123 of the object 121) to the AR content 130, and if the level of relevancy is above a threshold amount, the anchor module 114 is configured to determine that the detected object 121 is associated with the AR content 130. In some examples, the level of relevancy is determined based on the distance of the location of the object 121 to the location of the AR content 130 in the coordinate space (e.g., a shorter distance may indicate a higher relevancy).

In some examples, the level of relevancy is based on (e.g., further based on) a semantic comparison of the type 123 of the object 121 and the AR content 130. For example, the AR content 130 may be associated with one or more terms. As shown in FIG. 1, the AR content 130 includes the description "My chair." The anchor module 114 may detect the term "chair" from the AR content 130 and determine that the term "chair" is associated with the type 123 (e.g., chair classification). Then, the anchor module 114 may determine that one or more terms associated with the AR content 130 is semantically the same/similar to the type 123 of the object 121. In some examples, the AR content 130 includes a virtual object, and the anchor module 114 may detect the type of virtual object (e.g., using the techniques described above). If the type of virtual object and the type 123 of the object 121 are determined as semantically similar, the anchor module 114 may increase the level of relevancy and/or determine that the AR content 130 is associated with the object 121.

In response to the AR content 130 being determined as associated with the object 121, the anchor module 114 may generate a link 127 between the object 121 and the AR content 130, and store the coordinates of the AR content 130 with the link to the object 121 in the AR environment 101. For example, instead of only storing the coordinates of the AR content 130 at the AR scene storage 111, the AR content 130 is also stored with the link 127 to the object 121, which indicates that the AR content 130 with associated with a certain type of physical object (e.g., the AR content 130 references a chair in the physical environment). The link 127 may be computer-generated data that indicates that the object 121 is linked to the AR content 130. In some examples, the link 127 indicates the type 123 of the object 121 that is associated with the AR content 130.

When storing the scene 125 for future localization, the semantic content manager 112 may send or provide information about the object 121, the type 123, and the link 127 as well as the coordinates of the AR content 130 (which indicate the position of the AR content 130 in the coordinate space in which the image data 113a is mapped onto) to the AR collaboration service 104.

In some examples, the client AR application 110 is configured to detect a set of visual feature points from the image data 113a and track the movement of the set of visual feature points over time. The set of visual feature points are a plurality of points (e.g., interesting points) that represent the user's environment, and the set of visual feature points may be updated over time. In some examples, the set of visual feature points may be referred to an anchor or a set of persistent visual features that represent physical objects in the physical world, and the set of visual feature points are stored in the AR scene storage 111 to be used to localize the AR environment 101 in a subsequent session or for another user. For example, the visual feature points in the AR scene storages 113 may be used to compare and match against other visual feature points (e.g., detected from image data 113b) in order to determine whether the physical space is the same as the physical space of the stored visual feature points and to calculate the location of the computing device within the AR environment 101 in relation to the stored visual feature points in the AR scene storage 111.

In order to localize the AR content 130 on the computing device 106 in a subsequent session or on another computing device (e.g. the computing device 108), the AR localizer 116 may obtain image data 113b that captures at least a portion of the scene 125 of the AR environment 101. For example, a user may use a camera on the computing device 106 or the computing device 108 to capture at least a portion of the scene 125 from the physical space of the AR environment 101.

The AR localizer 116 may detect, using the one or more ML models 115, whether the object 121 is present or has moved to a different location in the scene 125 using the current image data (e.g., the image data 113b). For example, when localizing the scene 125, the AR localizer 116 may determine that the AR content 130 to be rendered is associated with the type 123 of the object 121 based on the link 127 that is stored in the AR scene storage 111. Using the object recognition techniques described above, the AR localizer 116 is configured to detect whether an object 121 in the image data 113b having the same type 123 is present or located at the same location as the object 121 in the image data 113a.

For example, the AR scene storage 111 includes information that maps the image data 113a (and the AR content 130) to the coordinate space of the AR environment 101. Continuing with the above example, the AR scene storage 111 includes information that maps the chair onto the coordinate space. Using the image data 113b, the AR localizer 116 is configured to detect whether the current scene 125 includes the type 123 of the object 121 that was stored in the AR scene storage 111. If the image data 113b includes a chair, the AR localizer 116 is configured to determine whether the chair that was stored in the AR scene storage 111 is located at the same position as the chair detected in the image data 113b. If the chair is located at a different position, the AR localizer 116 is configured to determine the new location of the chair from the image data 113b.

Depending on the results of the AR localizer 116, an action module 118 of the semantic content manager 112 is configured to execute one or more actions. If the object 121 is detected as not present in the image data 113b, the action module 118 may cause the AR application 119 to not render the AR content 130 from the AR scene storage 111. If the object 121 is present in the image data 113b but has moved to a new location, the action module 118 is configured to move the AR content 130 in the AR environment 101 to be proximate to the new location of the object 121. In some examples, if the object 121 is not present in the image data 113b or has moved to a different location, the action module 118 may transmit, via an API 120, a notification to a developer associated with the AR content 130.

Figure 3A:
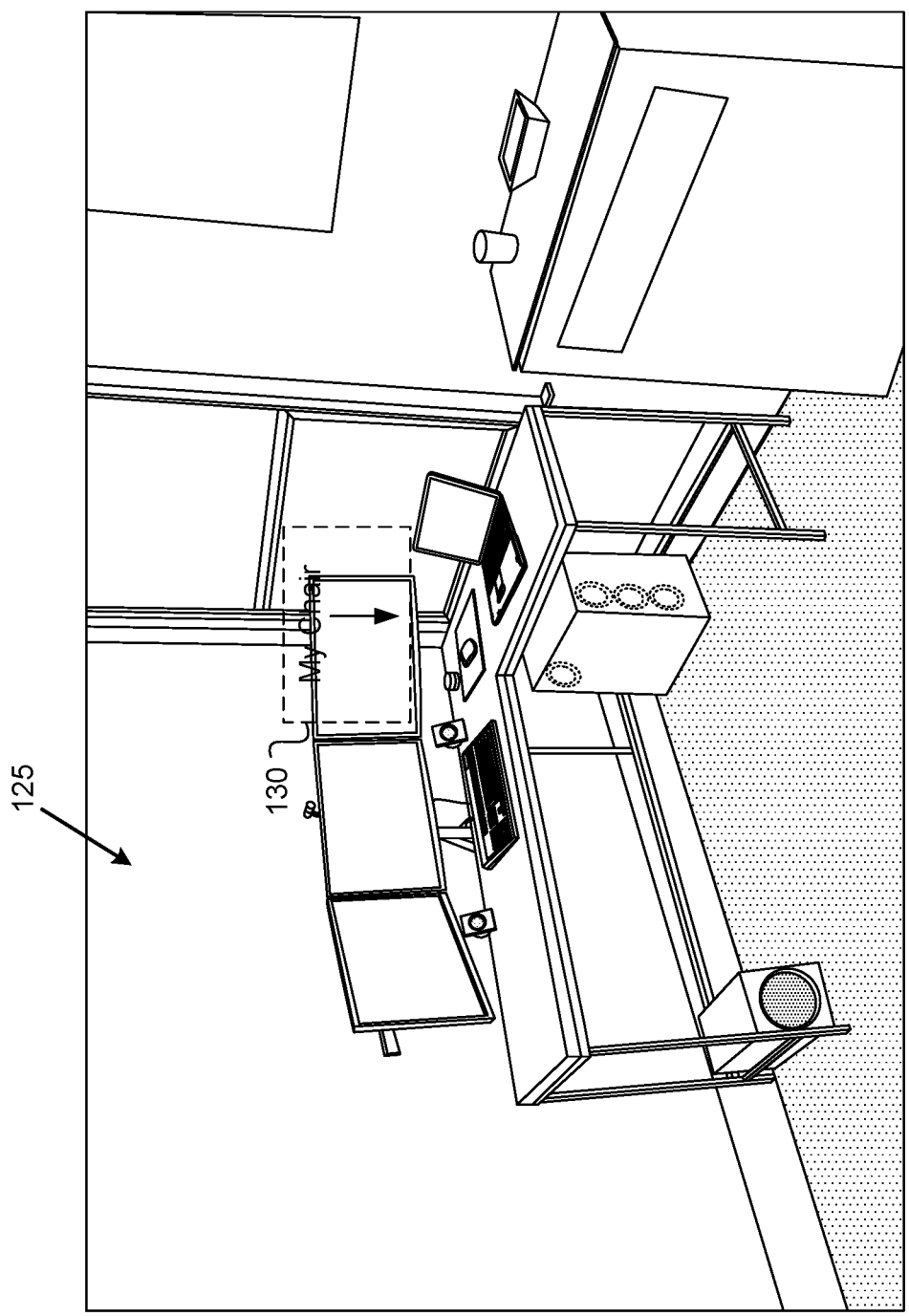
FIG. 3A depicts a conventional AR scene showing AR content for an object that moved outside of the scene.
Figure 3B:
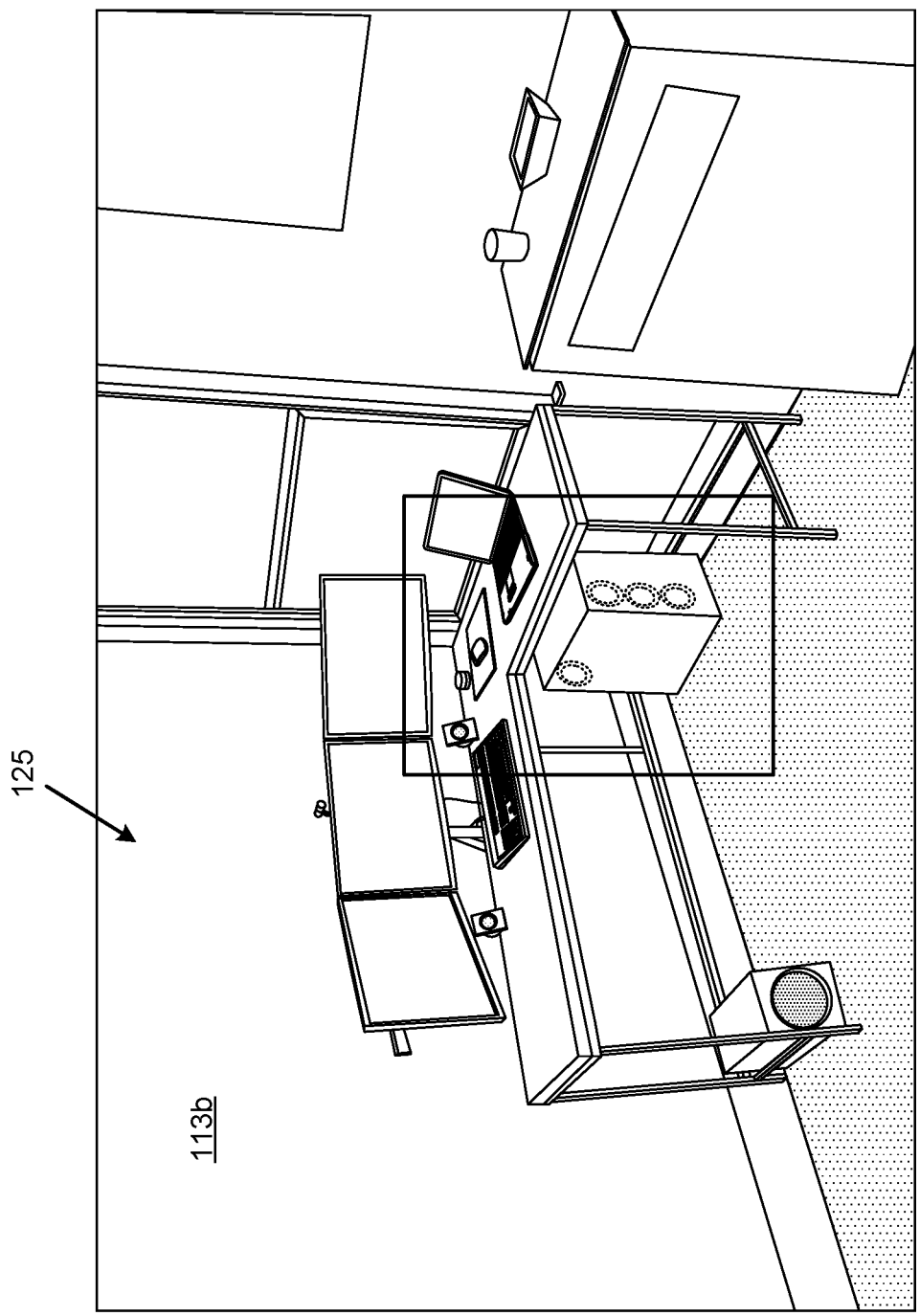
FIG. 3B depicts an AR scene from an AR system having the semantic content manager according to an aspect.

FIG. 3A illustrates the results of an AR system without the semantic content manager 112 when an object is no longer in the scene 125. For example, as shown in FIG. 3A, when the physical object (e.g., the chair) is no longer in the scene 125 captured by a computing device 106, an AR system (without the semantic content manager 112) may still render the AR content 130. However, as shown in FIG. 3B, the semantic content manager 112 is configured to detect that the image data 113b does not include the object 121 having the determined type 123. As a result, as shown in FIG. 3B, the semantic content manager 112 is configured to cause the AR content 130 to not be rendered in the scene 125 of the AR environment 101.

Figure 4A:
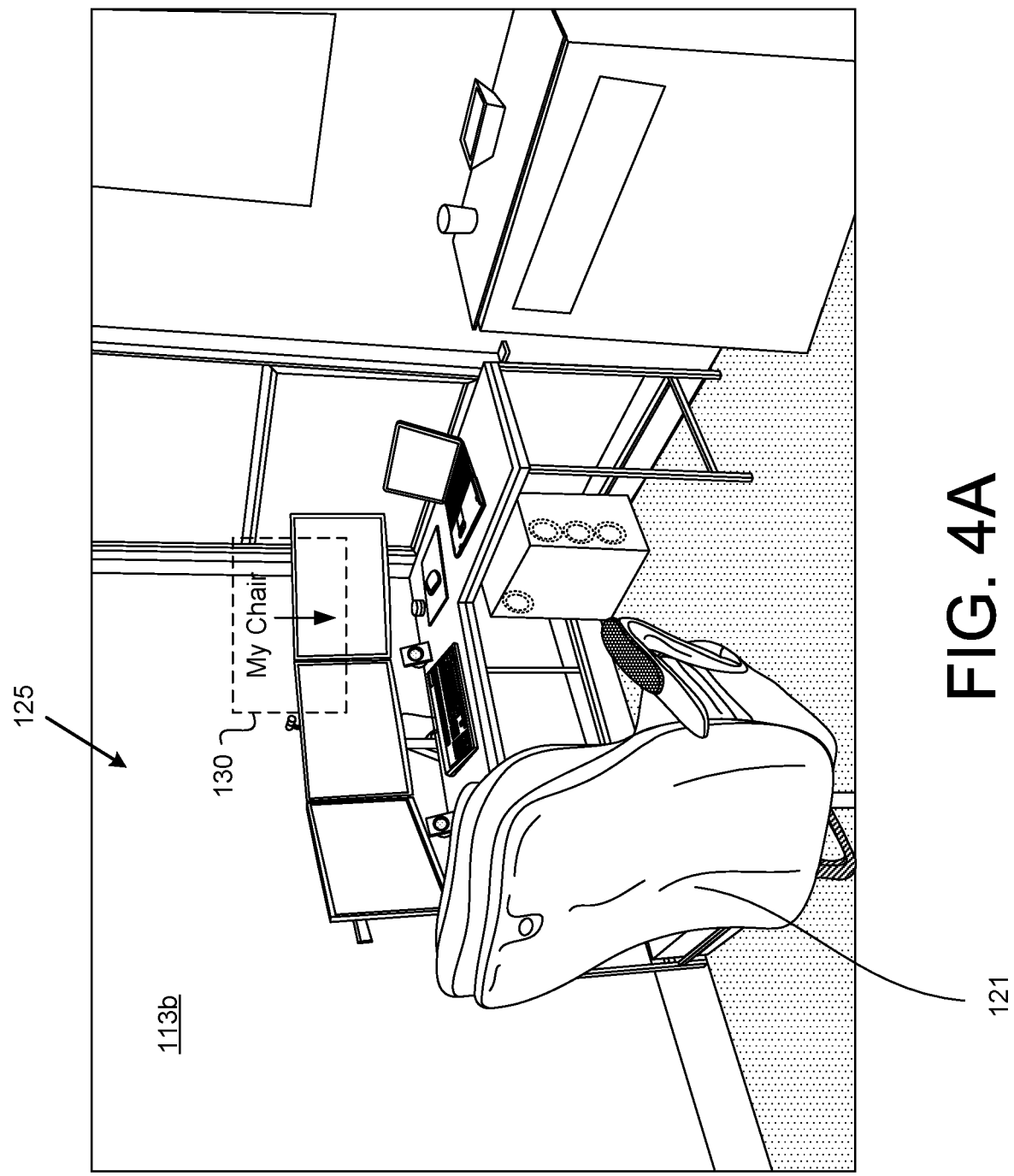
FIG. 4A depicts a conventional AR scene showing AR content for an object that moved to a different location in the scene.
Figure 4B:
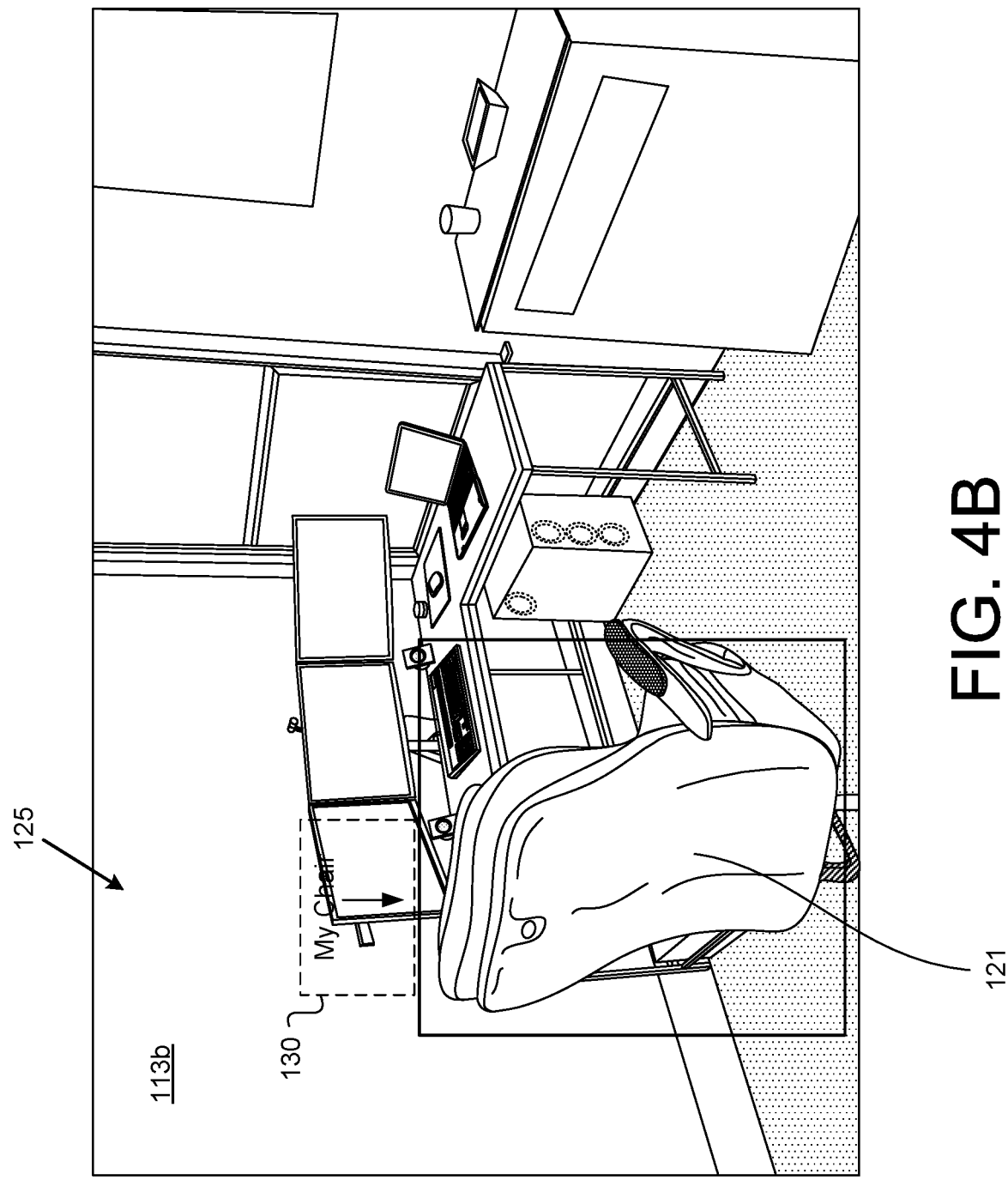
FIG. 4B depicts an AR scene from an AR system having the semantic content manager according to another aspect.

FIG. 4A illustrates the results of an AR system without the semantic content manager 112 when the physical object has moved to a different location in the scene 125. For example, as shown in FIG. 4A, when the physical object 121 moves to a new location in the scene 125, a conventional AR system may still render the AR content 130 in the position of the saved scene since the AR content 130 is attached to only the coordinates of the AR space, which may cause the AR content 130 to be inaccurate. According to the embodiments, as shown in FIG. 4B, the semantic content manager 112 is configured to detect that the object 121 is within a new location from the image data 113b, and automatically move the AR content 130 to a position that corresponds to the new location of the object 121.

Figure 5:
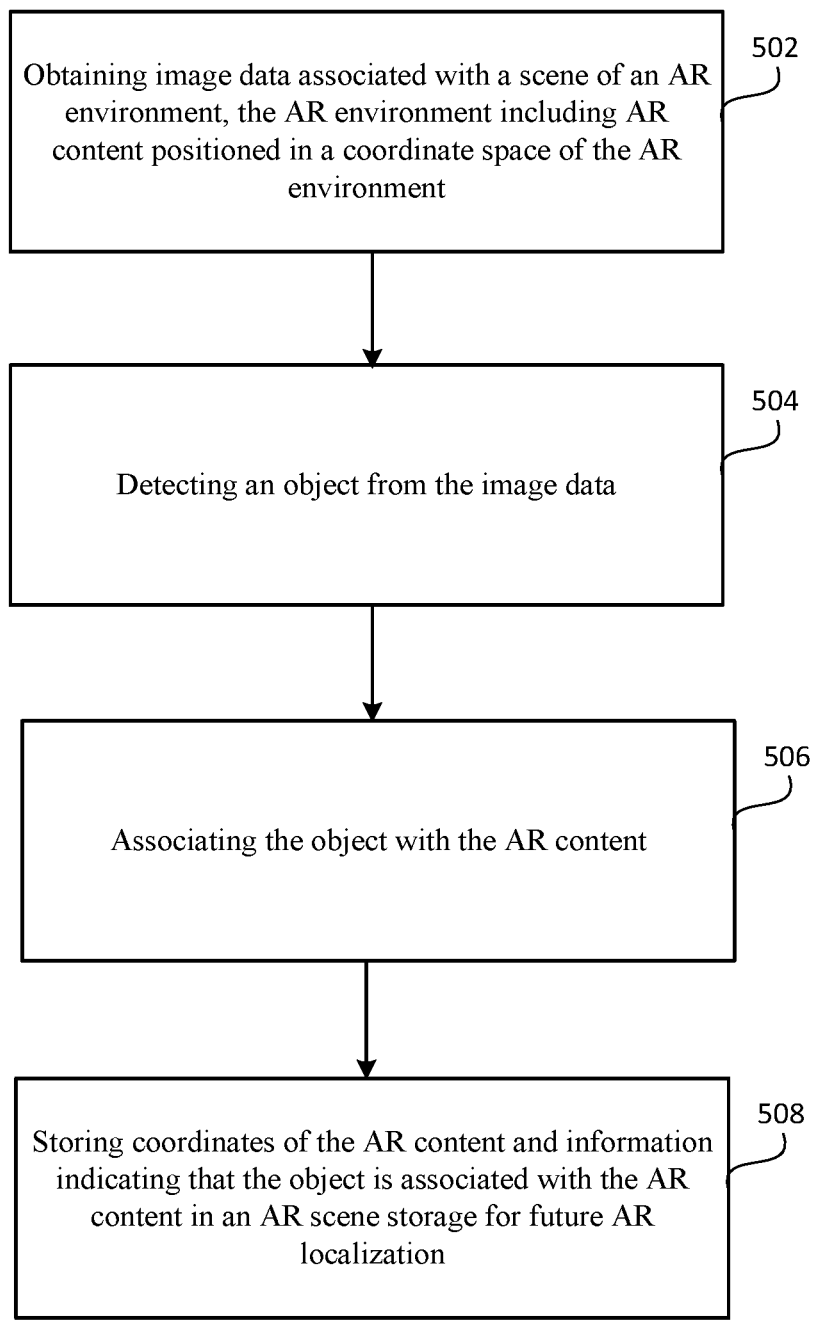
FIG. 5 illustrates a flow chart depicting example operations for managing AR content when storing an AR scene for future localization according to an aspect.

FIG. 5 illustrates a flow chart 500 depicting example operations of the AR system 100 according to an aspect. The example operations of the flow chart 500 relate to the detection of an object associated with AR content when storing an AR scene for future localization.

Operation 502 includes obtaining image data 113a associated with a scene 125 of an AR environment 101, where the AR environment 101 includes AR content 130 positioned in a coordinate space of the AR environment 101. Operation 504 includes detecting an object 121 from the image data 113a. Operation 506 includes associating the object 121 with the AR content 130. Operation 508 includes storing coordinates of the AR content 130 and information indicating that the object 121 is associated with the AR content 130 in AR scene storage 111 for future AR localization.

Figure 6:
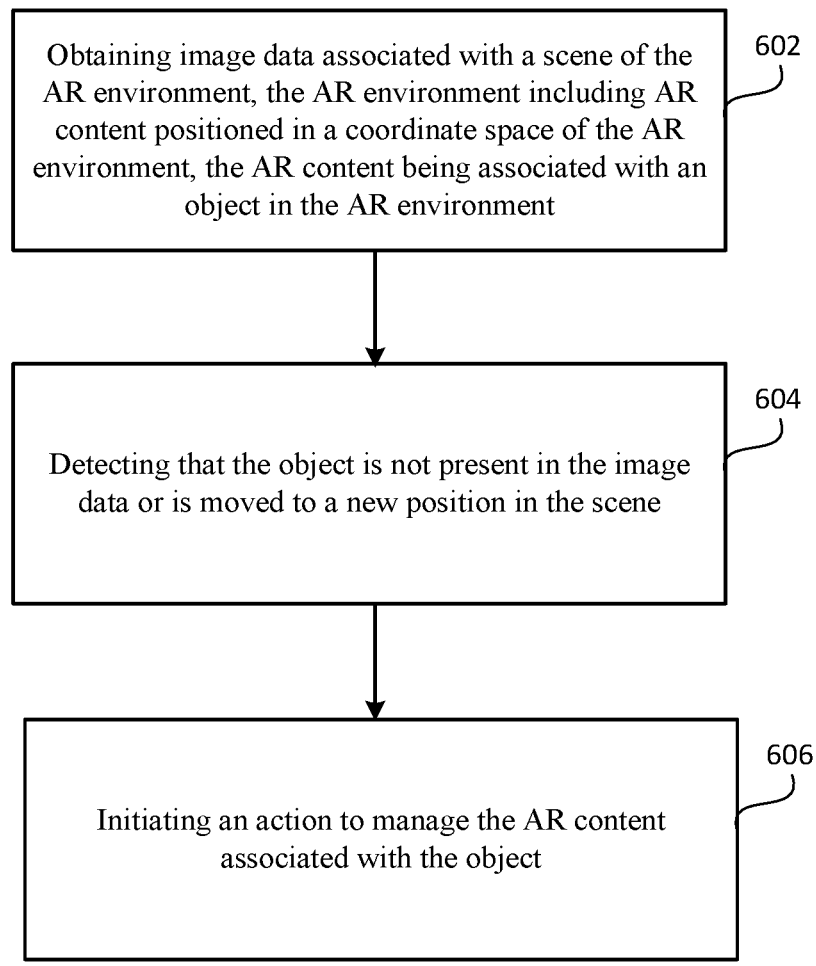
FIG. 6 illustrates a flow chart depicting example operations for managing AR content when localizing an AR scene according to an aspect.

FIG. 6 illustrates a flow chart 600 depicting example operations of the AR system 100 according to an aspect. The example operations of the flow chart 600 relate to the detection of an object associated with AR content when localizing to a current session.

Operation 602 includes obtaining image data 113b associated with a scene 125 of the AR environment 101, where the AR environment 101 includes AR content 130 positioned in a coordinate space of the AR environment 101, and the AR content 130 is associated with an object 121 in the AR environment 101. Operation 604 includes detecting that the object 121 is not present in the image data 113b or is moved to a new position in the scene 125. Operation 606 includes initiating an action to manage the AR content 130 associated with the object 121. In some examples, the action includes removing the AR content 130 for display within the scene 125, re-positioning the AR content 130 to a location corresponding to the new location of the object 121, and/or sending a notification to a developer of the AR content 130.

Figure 7:
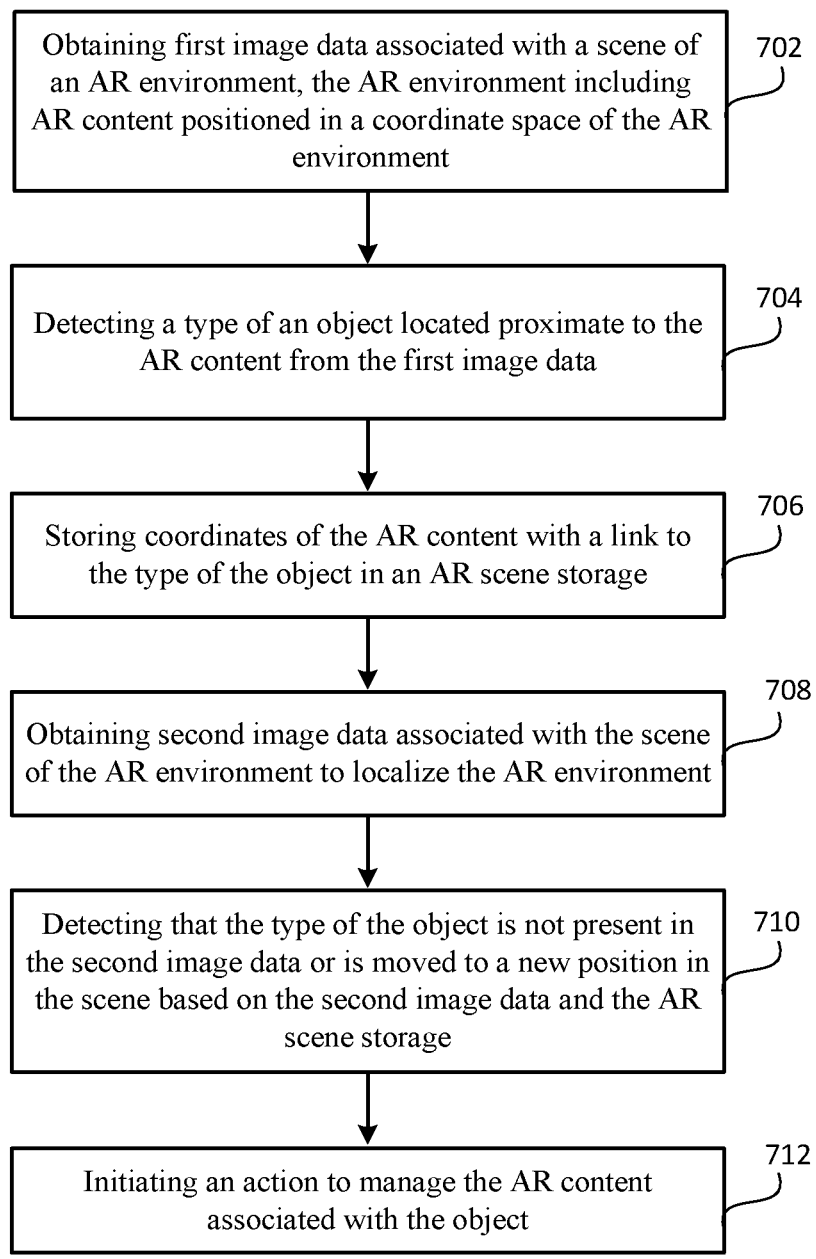
FIG. 7 illustrates a flow chart depicting example operations for managing AR content when storing and localizing an AR scene according to an aspect.

FIG. 7 illustrates a flow chart 700 depicting example operations of the AR system 100 according to an aspect. The example operations of the flow chart 700 relate to the detection of an object associated with AR content when storing from a first session and localizing to a second session.

Operation 702 includes obtaining first image data 113a associated with a scene 125 of an AR environment 101, where the AR environment 101 includes AR content 130 positioned in a coordinate space of the AR environment 101. Operation 704 includes detecting a type 123 of an object 121 located proximate to the AR content 130 from the first image data 113a. Operation 706 includes storing coordinates of the AR content 1230 with a link 127 to the type 123 of the object 121 in AR scene storage 111. Operation 708 includes obtaining second image data 113b associated with the scene 125 of the AR environment 101 to localize the AR environment 101. Operation 710 including detecting that the type 123 of the object 121 is not present in the second image data 113b or is moved to a new position in the scene 125 based on the second image data 113b and the AR scene storage 111. Operation 712 including initiating an action to manage the AR content 130 associated with the object 121.

Figure 8:
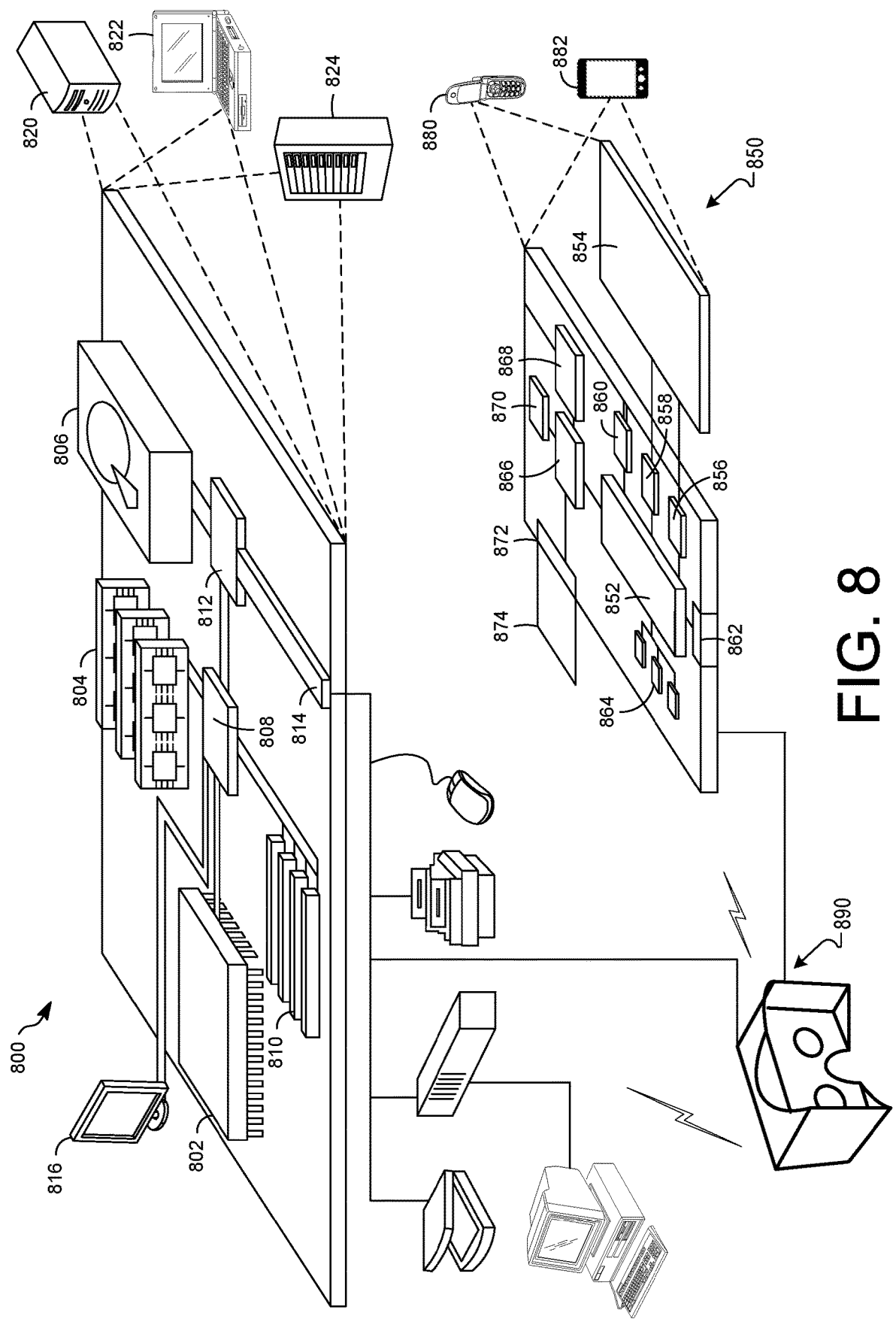
FIG. 8 illustrates example computing devices of the AR system according to an aspect.

FIG. 8 shows an example of an example computer device 800 and an example mobile computer device 850, which may be used with the techniques described here. Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. In addition, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, Wi-Fi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. In addition, the term "module" may include software and/or hardware.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 8 can include sensors that interface with a virtual reality (VR headset 890). For example, one or more sensors included on a computing device 850 or other computing device depicted in FIG. 8, can provide input to VR headset 890 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 850 can use the sensors to determine an absolute position and/or a detected rotation of the computing device in the VR space that can then be used as input to the VR space. For example, the computing device 850 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 850 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 850 when the computing device is incorporated into the VR space can cause a particular action to occur in the VR space.

In some implementations, a touchscreen of the computing device 850 can be rendered as a touchpad in VR space. A user can interact with the touchscreen of the computing device 850. The interactions are rendered, in VR headset 890 for example, as movements on the rendered touchpad in the VR space. The rendered movements can control objects in the VR space.

In some implementations, one or more output devices included on the computing device 850 can provide output and/or feedback to a user of the VR headset 890 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 850 may appear as another object in a computer-generated, 3D environment. Interactions by the user with the computing device 850 (e.g., rotating, shaking, touching a touchscreen, swiping a finger across a touch screen) can be interpreted as interactions with the object in the VR space. In the example of the laser pointer in a VR space, the computing device 850 appears as a virtual laser pointer in the computer-generated, 3D environment. As the user manipulates the computing device 850, the user in the VR space sees movement of the laser pointer. The user receives feedback from interactions with the computing device 850 in the VR space on the computing device 850 or on the VR headset 890.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method for managing augmented reality (AR) content the method comprising:
   storing a scene of an AR environment captured by a first computing device in a storage device, the scene being represented by a three-dimensional (3D) map, the storing including:
     obtaining first image data from a camera associated with the first computing device;
     receiving an indication that a virtual object has been added by a user;
     marking a location of the virtual object in a coordinate space of the 3D map;
     detecting a physical object from the first image data that is referenced by or within a threshold distance from the virtual object; and
     linking the physical object with the virtual object in the coordinate space; and
   localizing the AR environment on a second computing device, including:
     obtaining second image data from a camera associated with the second computing device;
     determining that the second image data corresponds to a physical space associated with the first image data, including comparing visual features from the second image data with the 3D map;
     detecting that the physical object is not present or has moved to a new location in the second image data; and
     initiating an action to manage the virtual object linked to the physical object.

2. The method of claim 1, wherein the detecting includes detecting a classification of the physical object using at least one machine-learning (ML) model, the at least one ML model including a neural network, wherein the classification is stored with the location of the virtual object in the coordinate space.

3. The method of claim 2, wherein the classification includes a semantic label.

4. The method of claim 1, wherein the initiating the action includes causing the virtual object to not be rendered on the second computing device in response to the physical object not being detected in the second image data.

5. The method of claim 1, wherein the initiating the action includes moving the virtual object from the marked location to a location that corresponds to the new location of the physical object in the second image data.

6. The method of claim 1, wherein the initiating the action includes transmitting, via an application programming interface (API), a notification to a user that added the virtual object, the notification indicating that the physical object linked to the virtual object is no longer present or has moved to a new location in the physical space.

7. The method of claim 1, wherein the detecting includes: analyzing text of the virtual object: determining that the text is associated with a classification of the physical object; and linking the classification of the physical object with the virtual object.

8. An augmented reality (AR) system for managing AR content, the AR system comprising:
   an AR collaborative service executable by at least one server; and
   a client AR application executable by a first computing device or a second computing device, the client AR application configured to communicate with the AR collaborative service via one or more application programming interfaces (APIs),
   the AR collaborative service or the client AR application configured to store a scene of an AR environment in a storage device, the scene being represented by a three-dimensional (3D) map, including:
     obtain first image data from a camera associated with the first computing device;
     receiving an indication that a virtual object has been added by a user;
     marking a location of the virtual object in a coordinate space of the 3D map;
     detect a physical object from the first image data that is referenced by or within a threshold distance of the virtual object; and
     link the physical object with the virtual object in the coordinate space,
   the AR collaborative service or the client AR application configured to localize the AR environment on the second computing device during a subsequent AR session, including:
     obtain second image data from a camera associated with the second computing device;
     determine that the second image data corresponds to a physical space associated with the first image data, including compare visual features from the second image data with the 3D map;
     detect that the physical object is not present or has moved to a new location in the second image data; and
     initiate an action to manage the virtual object linked to the physical object.

9. The AR system of claim 8, wherein the AR collaborative service or the client AR application is configured to detect a classification of the physical object using at least one machine-learning (ML) model, the at least one ML model including a neural network.

10. The AR system of claim 9, wherein the classification includes a semantic label.

11. The AR system of claim 8, wherein the client AR application is configured to cause the virtual object not to be rendered on the second computing device in response to the physical object not being detected in the second image data.

12. The AR system of claim 8, wherein the AR collaborative service or the client AR application is configured to move the virtual object from the marked location to a location that corresponds to the new location of the physical object in the second image data.

13. The AR system of claim 8, wherein the AR collaborative service or the client AR application is configured to transmit, via an API, a notification to a user that added the virtual object, the notification indicating that the physical object linked to virtual object is no longer present or has moved to a new location in the physical space.

14. The AR system of claim 8, wherein the AR collaborative service or the client AR application is configured to analyze text of the virtual object, and determine that the text is associated with a classification of the physical object, wherein the classification is linked with the virtual object.

15. A non-transitory computer-readable medium storing executable instructions that when executed by at least one processor are configured to manage augmented reality (AR) content, the executable instructions including instructions that cause the at least one processor to:
  store a scene of an AR environment captured by a first computing device in a storage device, the scene being represented by a three-dimensional (3D) map, including:
    obtain first image data from a camera associated with the first computing device;
    receive an indication that a virtual object has been added by a user;
    mark a location of the virtual object in a coordinate space of the 3D map;
    detect, using the first image data, a classification of a physical object that is referenced by or within a threshold distance from the virtual object; and
    store the location of the virtual object with a link to the classification of the physical object in the storage device; and
  localize the AR environment on a second computing device including:
    obtain second image data from a camera associated with the second computing device;
    determine that the second image data corresponds to a physical space associated with the first image data, including compare visual features from the second image data with the 3D map;
    detect that the physical object is not present or has moved to a new location in the second image data; and
    initiate an action to manage the virtual object linked to the physical object.

16. The non-transitory computer-readable medium of claim 15, wherein the initiate the action includes instructions to not render the virtual object on the second computing device in response to the physical object not being detected in the second image data.

17. The non-transitory computer-readable medium of claim 15, wherein the initiate the action includes instructions to move the virtual object from the marked location to a location that corresponds to the new location of the physical object in the second image data.

18. The non-transitory computer-readable medium of claim 15, wherein the initiate the action includes instructions to transmit, via an application programming interface (API), a user that added, a notification indicating that the physical object linked to the virtual object is no longer present or has moved to a new location in the physical space.

* * * * *

UNITED STATES PATENT AND TRADEMARK OFFICE
CERTIFICATE OF CORRECTION

PATENT NO. : 11,055,919 B2  
APPLICATION NO. : 16/395832  
DATED : July 6, 2021  
INVENTOR(S) : Nattinger et al.

Page 1 of 1

It is certified that error appears in the above-identified patent and that said Letters Patent is hereby corrected as shown below:

In the Claims

Column 15, Claim 1, Lines 38-39, delete "content" and insert -- content, --, therefor.

Column 16, Claim 7, Line 25, delete "object:" and insert -- object; --, therefor.

Column 16, Claim 7, Lines 25-28, delete "determining that the....... the virtual object." and insert the same at "Line 26" as a new point.

Column 18, Claim 15, Line 11, delete "device" and insert -- device, --, therefor.

Signed and Sealed this  
Eighth Day of March, 2022

Drew Hirshfeld  
*Performing the Functions and Duties of the*  
*Under Secretary of Commerce for Intellectual Property and*  
*Director of the United States Patent and Trademark Office*